United States Patent [19]

Yamato

[11] 4,171,739
[45] Oct. 23, 1979

[54] CONVEYOR FOR CONVEYING MATERIALS THROUGH VARIOUS PROCESSES

[76] Inventor: Hiroyuki Yamato, No. 266, Oaza Yashimatsu, Dazaifu-machi, Tsukushi-gun, Fukuoka-ken, Japan

[21] Appl. No.: 852,284

[22] Filed: Nov. 17, 1977

Related U.S. Application Data

[63] Continuation-in-part of Ser. No. 710,631, Jul. 30, 1976, abandoned.

[30] Foreign Application Priority Data

| Aug. 7, 1975 | [JP] | Japan | 50-96374 |
| Dec. 15, 1975 | [JP] | Japan | 50-150067 |
| Dec. 15, 1975 | [JP] | Japan | 50-169974 |

[51] Int. Cl.² ................................. B65G 17/36
[52] U.S. Cl. ............................ 198/704; 198/792; 99/443 C
[58] Field of Search ............ 198/342, 646, 655, 701, 198/704, 712, 713, 792, 833; 99/362, 443 C

[56] References Cited

U.S. PATENT DOCUMENTS

| 620,298 | 2/1899 | Frith | 198/792 |
| 1,960,123 | 5/1934 | Roberts | 198/792 |
| 2,622,344 | 12/1952 | Newman | 198/704 |
| 3,031,066 | 4/1962 | Leach | 198/792 |
| 3,449,024 | 6/1969 | Lichte | 308/187.1 X |
| 3,814,234 | 6/1974 | Santen | 198/704 |
| 3,958,847 | 5/1976 | Cain et al. | 308/184 A X |
| 3,986,754 | 10/1976 | Torrant | 308/196 |
| 4,042,103 | 8/1977 | Santen | 198/704 |

FOREIGN PATENT DOCUMENTS 1174194 7/1964 Fed. Rep. of Germany ........... 198/792

Primary Examiner—Joseph E. Valenza
Attorney, Agent, or Firm—Kurt Kelman

[57] ABSTRACT

A conveyor for conveying a series of successive buckets along a path from a charging hopper through various processes to a receiving hopper, which comprises a pair of chain links holding the buckets therebetween so that they are spaced apart along sections of the path and conjoined in at least one horizontal section of the path. Each bucket has a pivotal cover held between two bell cranks and spring-biased selectively into open and closed positions. The buckets are positioned with the covers facing the receiving hopper. A rocking arm is arranged for periodically engaging the cover of each successive bucket to open the cover when the bucket is positioned above the receiving hopper and the cover is closed after each successive bucket is charged.

2 Claims, 12 Drawing Figures

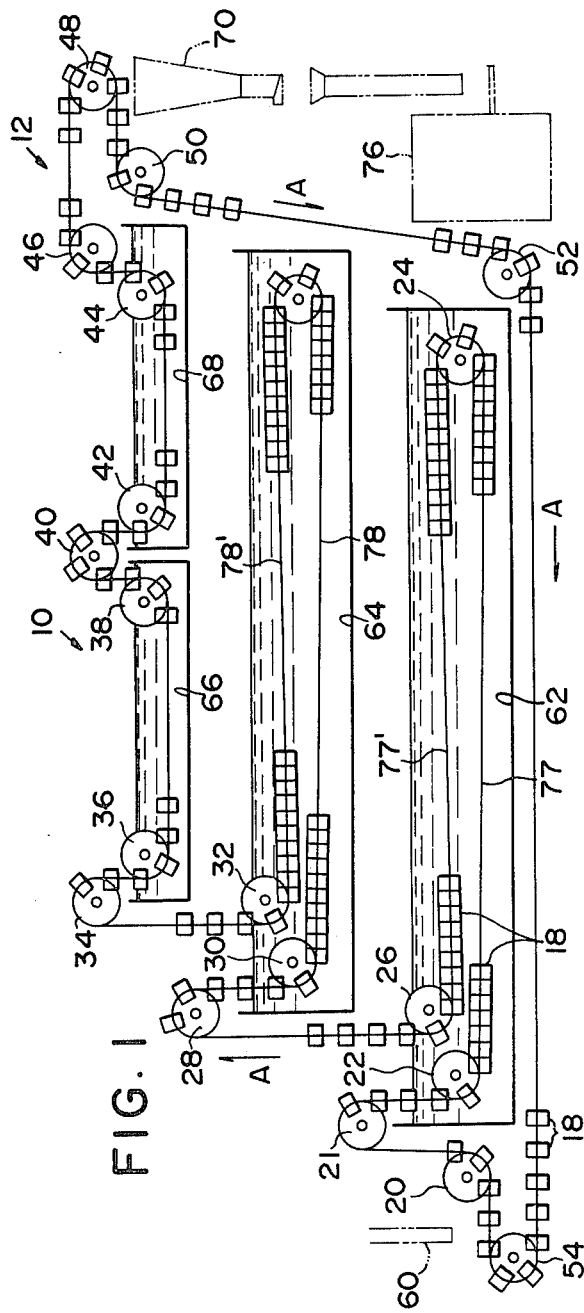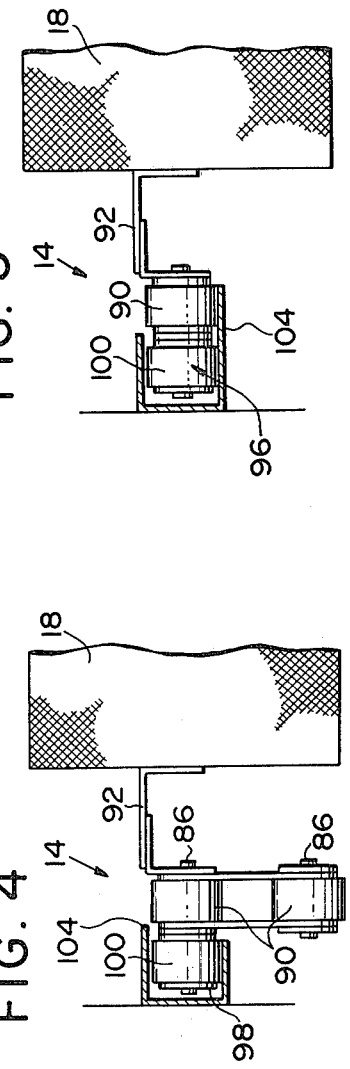

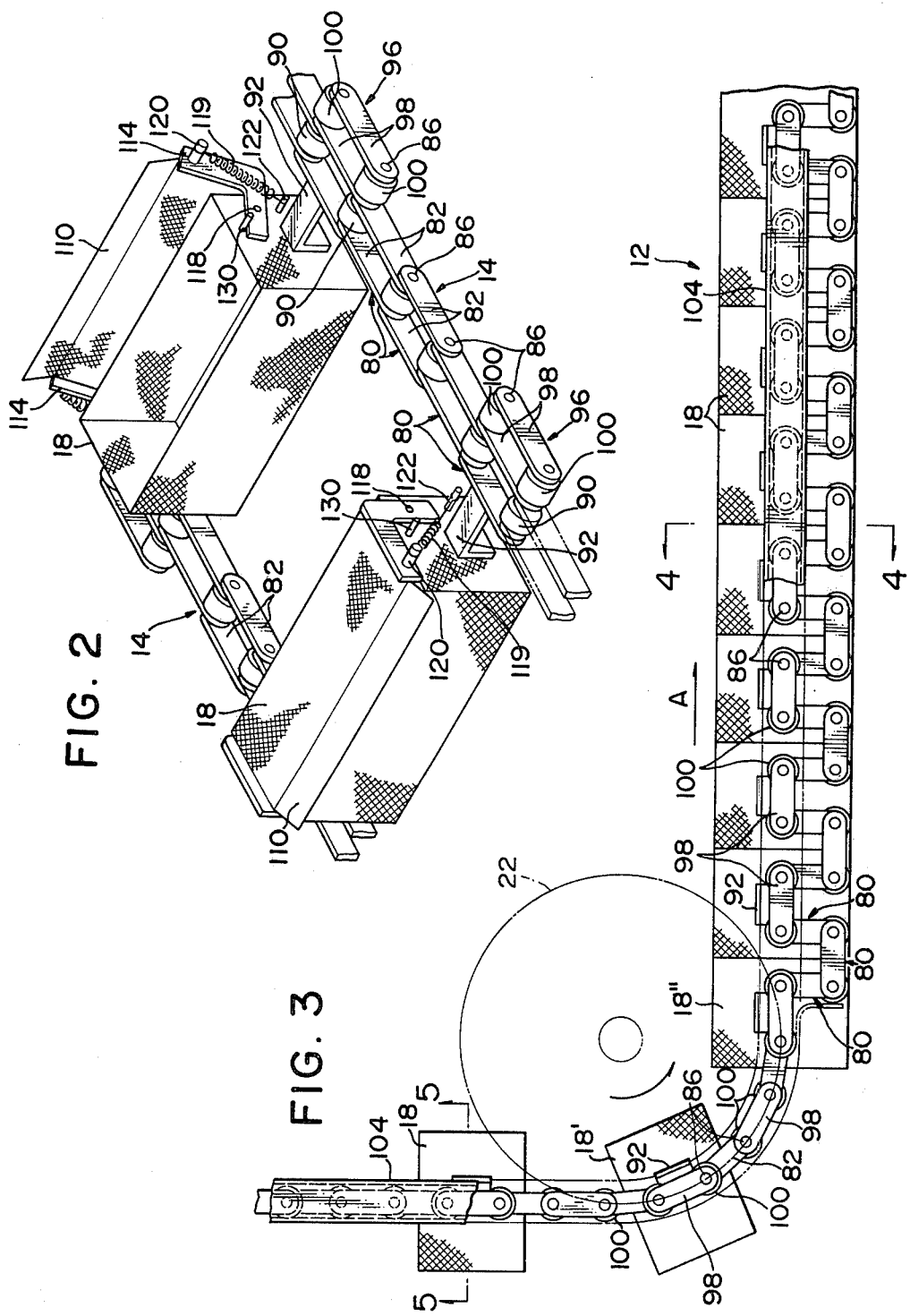

CONVEYOR FOR CONVEYING MATERIALS THROUGH VARIOUS PROCESSES

BACKGROUND OF THE INVENTION

This is a continuation-in-part of United States patent application Ser. No. 710,631 filed on July 30, 1976, now abandoned.

The invention relates, to conveyors of the type used for moving materials, especially foods such as noodles and potato chips, in buckets through various processes such as a boiling process, a steaming process, a frying process etc. so as to automatically and successively make boiled, steamed or fried foods.

There are various well known conveyors of the type as stated above. Such conveyors generally have a common basic construction in which a series of successively arranged buckets adapted to receive materials to be processed therein are supported by a pair of chains provided at the opposite sides of the series of buckets and the chains are trained and advanced over a plurality of sprocket wheels. In such conveyors, the buckets must be supported by the chains with a uniform space between the successive buckets so that the buckets can be smoothly advanced around the sprocket wheels without interference therebetween. However, the spaces are useless in straight run sections of the conveyor and, thus, it is desired to eliminate the spaces between the successive buckets in the straight run sections conjoining the buckets for the purpose of making the apparatus incorporated with the conveyor more compact. In particular, when the spaces are maintained between the buckets which are straightly advanced in process stations such as frying tank and boiling tank, the process stations become large and various accompanying problems occur, for example, the apparatus associated with the process stations such as furnace and process liquid supplying apparatus become large. Therefore, it is desired to eliminate such spaces between the buckets in the straight run sections in the process stations.

In the past, there have been provided various conveyors in which a series of buckets can be advanced in the condition that the buckets are conjoined. For example, U.S. Pat. No. 620,298 and No. 3,031,066 show such conveyors. That is, in the conveyors disclosed in these patents, each of the spaced-apart buckets is provided with a pivot pin and the pins are interconnected by chain means so that, when the buckets are advanced, they are conjoined under a material supplying device by bending the portion of the chain between the pins so as to enable materials to be loaded into the buckets without spilling therebetween.

However, the buckets of these conveyors are adapted to be freely rotatable around the above stated pin so as to maintain their horizontal position in any turning run sections and such construction is not readily adaptable to the conveyors for conveying materials such as foods through various processes because it is usual to move and mix the materials in the buckets during the advancement thereof so as to facilitate the processing of the materials.

SUMMARY OF THE INVENTION

Accordingly, one object of the invention is to provide a new conveyor which is adaptable to move the materials through various processes, in which the successive buckets for receiving and carrying materials are enabled to advance in the condition that the buckets are conjoined in straight-run sections while being spaced apart in turn-run sections and the buckets are adapted to be inclined in accordance with the inclination of the path of the conveyor to move and mix the materials in the buckets, each bucket having a cover which is adapted to hold the materials received in the respective buckets while the buckets are advanced through the processes.

A conveyor in accordance with the invention has a pair of spaced link chains, a series of buckets between and connected to the chains with a space between the successive buckets. Each of the chains of the conveyor has a series of first link means each of which is fixedly connected to a corresponding one of the buckets, two or more second link means between the successive first link means and pins interconnecting the respective ends of adjacent ones of the link means. The conveyor further has supporting means provided along the path of the conveyor which includes at least one substantially horizontal section by which the buckets are supported so that the buckets on the horizontal section can be advanced in a conjoined condition permitting the second link means to depend from the first link means. Since the buckets are fixedly provided with the first link means of the chains, the buckets are inclined during the advancement thereof in accordance with the inclination of the first link means as it is advanced along the path of the conveyor. Each of the buckets is further provided with a cover to hold the materials in the bucket in any angle position of the bucket.

BRIEF EXPLANATION OF THE DRAWINGS

FIG. 1 is a schematic view of an automated boiled noodle manufacturing plant in which a conveyor in accordance with the invention is incorporated;

FIG. 2 shows a perspective view of a portion of the conveyor of the invention adapted to be employed in the plant in FIG. 1;

FIG. 3 shows a side elevation view of a beginning portion of the conveyor led into the first boiling tank of the plant shown in FIG. 1;

FIG. 4 is an elevation view of a portion of the conveyor taken along the lines 4—4 of FIG. 3;

FIG. 5 is an elevation view of a portion of the conveyor taken along the lines 5—5 of FIG. 3;

DESCRIPTION OF THE PREFERRED EMBODIMENT

Figures 6A, 6B:
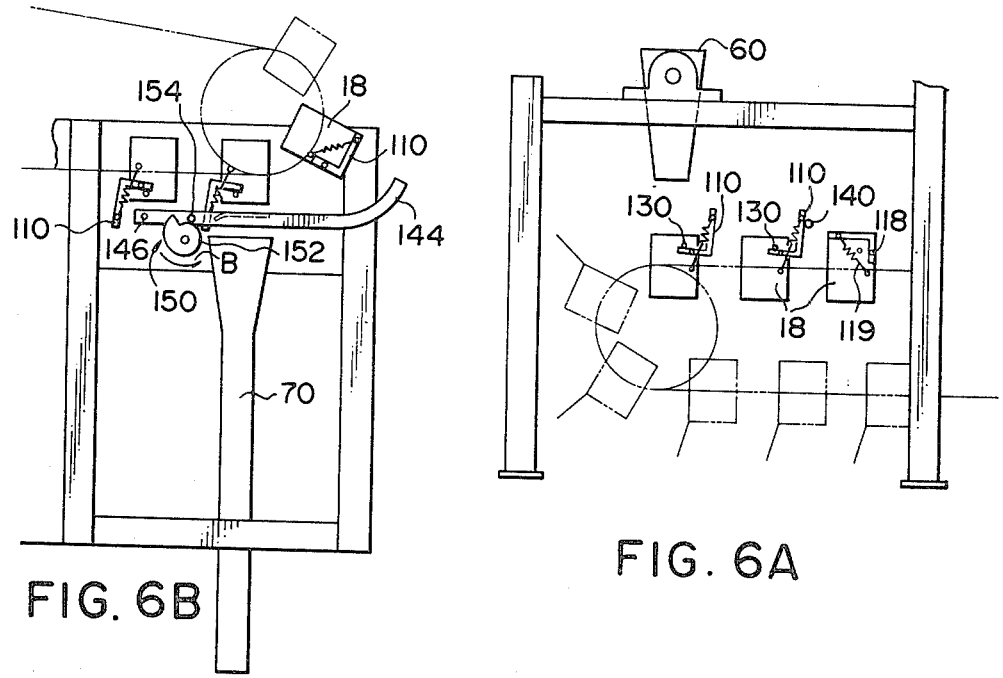
FIG. 6A is a side elevation view of the noodle loading station in the plant shown in FIG. 1.
FIG. 6B is a side elevation view of the boiled noodle unloading station in the plant shown in FIG. 1.

Referring to FIG. 1, there is shown an automated boiled noodle manufacturing plant 10 in which an endless conveyor 12 in accordance with the invention is employed.

As can be seen from FIGS. 2-7, the conveyor 12 has a pair of laterally spaced chains 14 and a series of perforated buckets 18 between and connected to the chains. In the plant, the chains are trained over a plurality of sprocket wheels 20-54 and advanced in a direction designated by an arrow A so that the buckets 18 are first supplied with a predetermined amount of noodles from a noodle supplying device 60 of the plant and then advanced through various process stations, i.e., a first boiling tank 62, a second boiling tank 64, cooling tank 66 and sterilizing tank 68. The buckets are further advanced over a hopper 70 to unload the processed or boiled noodles into the hopper and then returned to under the noodle supplying device 60. The unloaded noodles are fed into a packing device 76 from the hopper 70 so that a predetermined amount of noodles is packaged.

As shown in FIG. 1, in the boiled noodle manufacturing plant, the conveyor is arranged to be advanced in such a way that the buckets in run sections other than the horizontal run sections 77, 77', 78 and 78' within the first and second boiling tanks are spaced from each other and the buckets in the run sections 77, 77', 78 and 78' are conjoined. Such advancement of the conveyor is made possible by the construction of the conveyor described hereinbelow.

As shown in FIGS. 2 and 3, the chains 14 of the conveyor 12 are similar to conventional roller chains, i.e., the chains have a series of pairs 80 of laterally spaced link plates 82, pins 86 interconnecting respective ends of adjacent pairs and rollers 90 mounted on the pins. In the series of pairs of link plates, every fourth pair is fixedly connected to one of the series of buckets at one side thereof by a bracket 92. The fourth pair of link plates is further provided with a roller guide means on the other side thereof. The roller guide means 96 consists of a pair of plates 98 similer to the link plates 82 and the rollers 100 rotatably mounted on the pins interconnecting the ends of the forth pair of link plates to the ends of the adjacent pairs of link plates.

Referring to FIGS. 3-5, at the opposite sides of the conveyor are provided guide channels 104 (only one of which is shown) extended along the path of the conveyor. The channels are generally designed as shown in FIGS. 3 and 5, i.e., to receive and guide the chain of the conveyor; however, in the run sections 77, 77', 78 and 78' within first and second tanks 62 and 64, in which the buckets are to be conveyed in conjoined condition, the channels are designed as shown in FIGS. 3 and 4, i.e., to receive and support only roller guide means of the chains which are mounted on the pairs of link plates fixedly attached to the buckets so as to enable other pairs of link plates to depend from and between the pairs of link plates attached to the buckets.

The buckets in the horizontal run sections 77, 77', 78 and 78' in the tanks 62 and 64 are so arranged, in setting of the conveyor 12 in the automated boiled noodle manufacturing plant 10, that these buckets 18 contact each other, with the pairs of link plates other than the pairs attached to the buckets 18 being suspended between and from the latter pairs as shown in FIGS. 1 and 3, while the buckets in the other run sections are so arranged that they are spaced from each other by extending the pairs of link plates other than the pairs of link plates attached to the buckets between the latter pairs of link plates, as shown in FIG. 2.

Due to the construction of the conveyor 12 described above and as shown in FIG. 3, when the conveyor 12 is advanced, buckets 18' led into the horizontal run sections 77, 77', 78 and 78' come into contact with the last buckets 18" in these run sections, bending downwardly the portion of the chain between the pairs of link plates attached to the buckets because the buckets led into these run section are advanced at a rate faster than that of the conjoined buckets in the run sections. Accordingly, in the conveyor 12 of this invention, it becomes possible to convey the buckets in the condition as shown in FIGS. 1 and 3.

Since the successive buckets 18 are fixedly connected to every fourth pair of link plates of the chains, the buckets are inclined during advancement thereof in accordance with the inclination of the pairs of the link plates. That is, in the plant 10 shown in FIG. 1, the buckets are inverted several times per one circulation thereof in the plant and, thus, the materials in the buckets are also inverted and mixed.

In the conveyor of the invention, each of the buckets is provided with a cover 110 for holding the materials as shown in FIGS. 2, 6A, 6B and 7 while in FIGS. 1, 3, 4 and 5, they are omitted. The cover 110 is supported by a pair of bell cranks 114 at the opposite sides thereof. The cranks 114 are pivotably supported on the pivot pins 118 attached to the opposite sides of the bucket. A tension coil spring 119 is provided between a pin 120 attached to one end of the bell crank 114 and a pin 122 attached to the side of the bucket so that, when the pin 120 of the crank 114 is positioned at the left side of a line passing through the pivot pin 118 of the bell crank and the pin 122, the spring adds a force in the counterclockwise direction around the pin 118 to the bell crank to close the cover 110 and when the pin 120 comes to the right side of the line passing through the pins 118 and 122, the spring adds a force in the clockwise direction to the bell crank to open the cover 110. A pin 130 attached to the side of the bucket is adapted to stop the movement of the crank in the clockwise direction to maintain the cover in the open position.

As shown in FIG. 6A, a pin 140 is provided at a downstream position with respect to the position for supplying noodles into the buckets 18 from the noodle supplying device 60. The pin 140 is adapted to engage the cover opened for receiving the noodles in the bucket and turn it in counterclockwise direction around the pivot pin 118 of the cover so as to close it.

Figure 7:
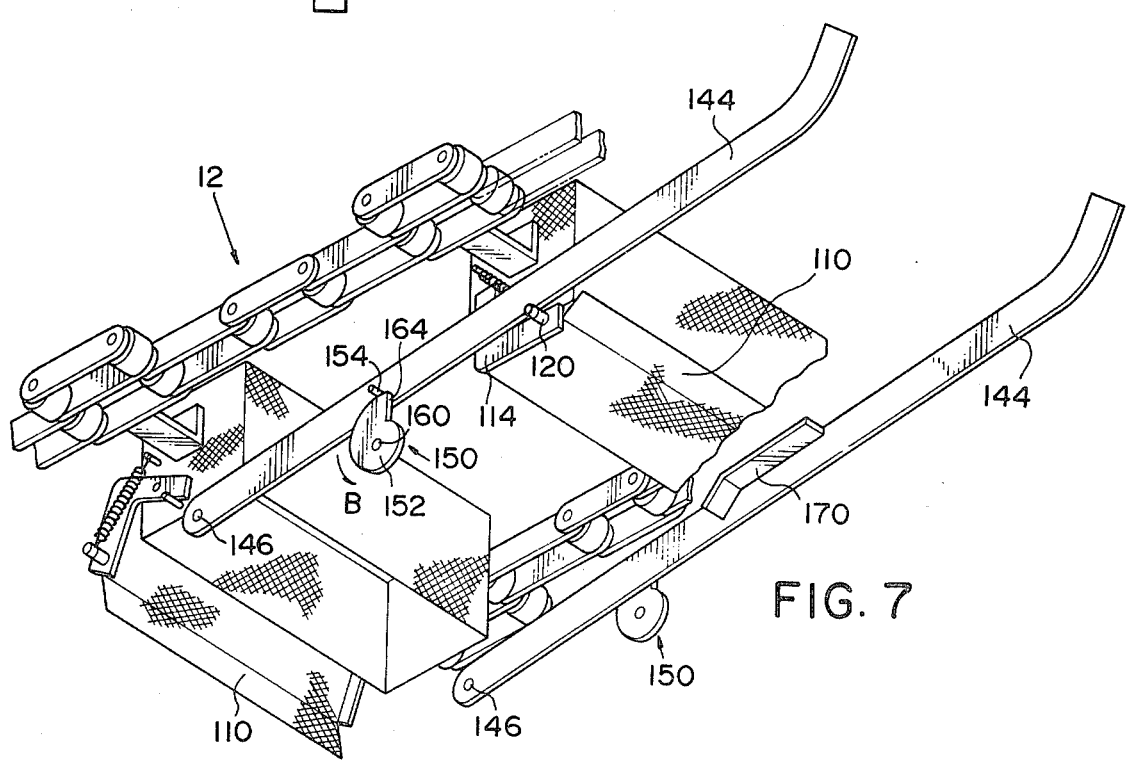
FIG. 7 is a perspective view of the portion of the conveyor advancing in the noodle unloading station of the plant shown in FIG. 1.

FIGS. 6B and 7 show a mechanism for opening the cover 110 for unloading the boiled noodles from the bucket 18 into the hopper 70. The mechanism has a pair of levers 144 which are positioned at the opposite sides of the conveyor. Each of the lever is adapted to be periodically swung about the pivot 146 thereof by cam mechanism 150. The cam mechanism 150 consists of a cam member 152 and a follower pin 154 which is fixed to the lever 144 and engaged with the peripheral surface of the cam member 152. The cam is adapted to rotate in a counterclockwise direction as designated by an arrow B and swing the lever in such manner that when the bucket has approached to a position just above the hopper 70, the pin 154 engages the portion of the peripheral surface which is the farthest from the rotation shaft 160 of the cam member 152 so as to move the lever into the uppermost position shown in FIG. 7 and, when the bucket comes just above the hopper 70, the pin descends along portion 164 of the cam surface onto the portion of the cam surface which is the nearest to the shaft 160 so as to suddenly and downwardly swing the lever. The lever has a hammer plate 170 at around the center of the lever 144 and the hammer plate 170 is adapted to be positioned above the pin 120 of the bell crank 114 of the cover 110 when the lever 144 has come into the uppermost position described above and to strike the pin 120 of the bell crank when the lever downwardly swings as described above so that the bell crank 114 suddenly rotates about the pin 118 thereof in a clockwise direction so as to open the cover.

Figure 8:
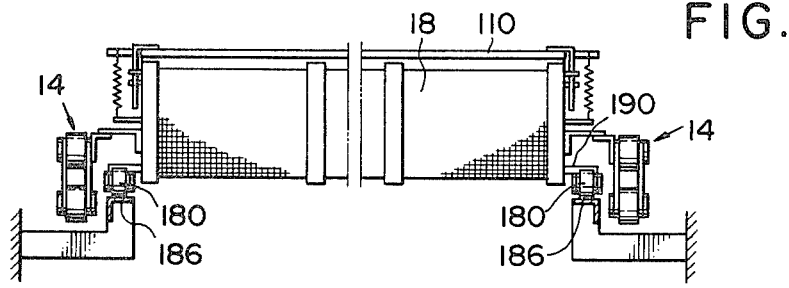
FIG. 8 is a front elevation view of another conveyor of the invention.
Figure 9:
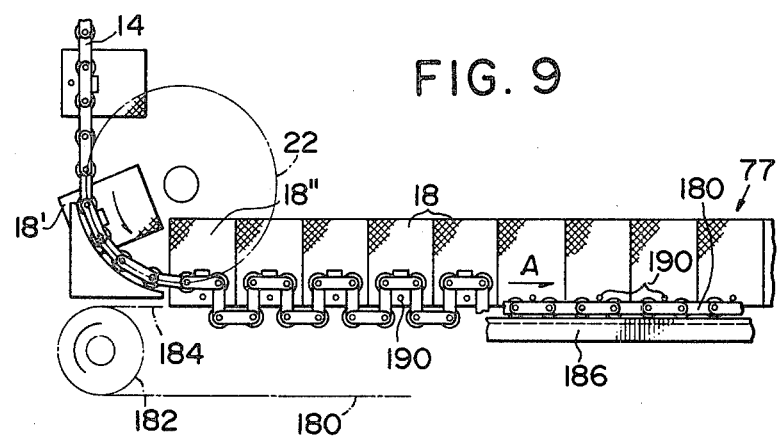
FIG. 9 is a side elevation view of the conveyor shown in FIG. 8.

Referring to FIGS. 8 and 9, there is shown another construction of the conveyor which is adapted to eliminate the spaces between the successive buckets 18 advanced in the horizontal run sections of the first and second boiling tanks 62 and 64.

In this embodiment, instead of the guide channels 104 described hereinbefore in FIG. 3-5, a pair of endless chains 180 positioned at the opposite sides of the conveyor 12 is provided under the respective horizontal run sections in the tanks 62 and 64 in which the successive buckets are to be advanced with no space therebetween to support and move together with the buckets in the straight run sections. Each of the chains 180 is trained over the sprocket wheels 182 (only one of which is shown) which are positioned adjacent the opposite ends of respective horizontal run sections in the tanks 62 and 64 and the upper run 184 of the chain is slidably supported on a stationary horizontal guide member 186. Each bucket 18 is supported on the chains by engaging the pins 190 attached to the opposite sides of the bucket on the chains.

In the conveyor, when a bucket 18' of the conveyor is advanced through the sprocket wheel 22 into the horizontal section 77, three pairs of link plates between the pairs of the link plates attached to the advanced bucket and the preceding bucket 18" will depend between and from the latter pairs due to the pressure from the sprocket wheel 22 and the gravity thereof so that the advanced bucket 18' comes into contact with the preceding bucket 18" and is supported by the chains by engaging the pins thereof with the chains.

Figure 10:
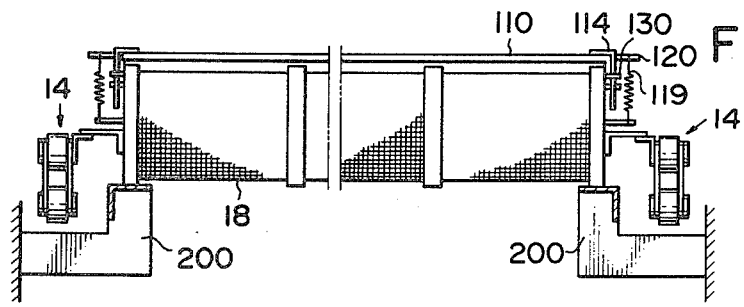
FIG. 10 is a front view of a still further conveyor of the invention.
Figure 11:
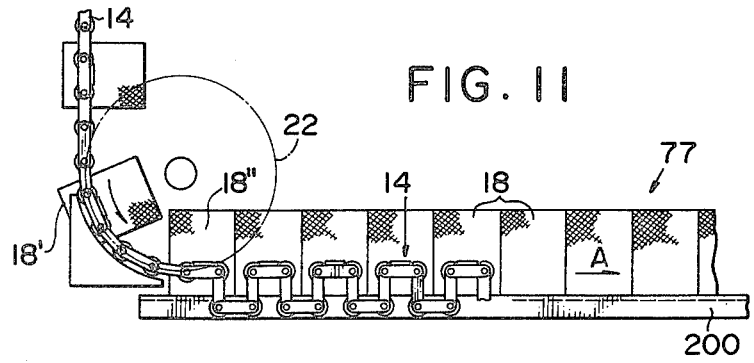
FIG. 11 is a side elevation view of the conveyor shown in FIG. 10.

Referring to FIGS. 10 and 11, there is shown still another construction of the conveyor in accordance with the invention. The conveyor is similar to that shown in FIGS. 8 and 9 but it has stationary guide plates 200 under the horizontal run section instead of the endless chains 180. That is, in this conveyor, the buckets in the straight run sections are slidably supported on the guide plates and are advanced along the guide plates with no space therebetween.

What is claimed is:

1. A conveyor for conveying materials along a path from a charging hopper through various processes to a hopper for receiving the processed materials, comprising:
   a series of successively arranged buckets;
   a pair of spaced link chains positioned at the opposite sides of said series of the buckets, each of the chains having a series of first link means each of which is fixedly connected to a corresponding one of the buckets, at least two more second link means between the successive first link means and pins interconnecting the respective ends of the adjacent ones of the link means;
   supporting means provided along the path of the conveyor, the supporting means including at least one substantially horizontal section by which the buckets are supported so that the buckets in the horizontal section are advanced in a conjoined condition permitting the second link means to depend from the first link means;
   a cover for each of said buckets to hold the materials in the bucket in any angle position of the bucket, said cover having a closure member having opposite side edges and two pivotal arms attached to the opposite side edges of the closure member for pivotally attaching the closure member to the bucket, each of said arms including a first arm portion positioned along one of said side edges and a second arm portion extending from one end of said first arm portion at an angle of about 90° along the side wall of said bucket, a pivot pin mounting said second arm portion pivotally on a respective side wall of the bucket adjacent an end of the second arm portion so as to allow the cover to pivot about the pivot pin, a first pin attached to each of said side walls, a second pin attached to the first arm portion adjacent the end opposite the one end thereof, a tension spring between the pins biasing the first arm portion so that, when the second pin is positioned at one side of a line passing through said pivot pin and said first pin, said cover is closed and, when the second pin comes to the other side of said line, the cover is opened, and a third pin on each of said side walls adapted to engaged said arm at a predetermined position in which said cover is opened so as to hold the cover in that position;
   means in said path for positioning the successively arranged buckets with the covers facing the hopper;
   means for opening said covers including a rocking arm adapted to be periodically rocked so as to periodically engage the cover of each successively arranged bucket positioned above the hopper to open said cover; and
   means adapted to engage the opened cover so as to close it after the materials are charged into the bucket.

2. A conveyor as set forth in claim 1, further comprising two spaced sprocket wheels over which the pair of spaced link chains are trained to define said horizontal section, and wherein the said supporting means comprises an endless chain means, two additional sprocket wheels positioned under and adjacent the first-named sprocket wheels, the endless chain means being trained over the additional sprocket wheels and having an upper run parallel to the horizontal section, successive ones of said buckets being advanced by one of said sprocket wheels onto said upper run of the endless chain means for support thereon conjoined to a preceding one of the buckets, the endless chain means being moved by the advancing conjoined buckets supported thereon.

* * * * *